United States Patent
Liu et al.

(10) Patent No.: US 11,258,357 B1
(45) Date of Patent: Feb. 22, 2022

(54) EMI REDUCTION IN PWM INVERTERS USING ADAPTIVE FREQUENCY MODULATED CARRIERS

(71) Applicants: Mitusubishi Electric Research Laboratories, Inc., Cambridge, MA (US); Mitsubishi Electric Corporation, Tokyo (JP)

(72) Inventors: Dehong Liu, Lexington, MA (US); Retsu Sugawara, Tokyo (JP); Philip Orlik, Cambridge, MA (US)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/036,045

(22) Filed: Sep. 29, 2020

Related U.S. Application Data

(60) Provisional application No. 63/070,290, filed on Aug. 26, 2020.

(51) Int. Cl.
*H02M 1/44* (2007.01)
*H02P 27/08* (2006.01)

(52) U.S. Cl.
CPC .............. *H02M 1/44* (2013.01); *H02P 27/08* (2013.01)

(58) Field of Classification Search
CPC ................................. H02M 1/44; H02P 27/08
See application file for complete search history.

(56) References Cited

U.S. PATENT DOCUMENTS

| | | | |
|---|---|---|---|
| 5,661,390 A * | 8/1997 | Lipo ..................... | H02M 1/44 318/492 |
| 8,907,604 B2 | 12/2014 | Miller et al. | |
| 9,093,946 B2 | 7/2015 | Kim | |
| 10,003,267 B1 * | 6/2018 | Zhao ...................... | H02M 1/44 |
| 2009/0073726 A1 * | 3/2009 | Babcock ............... | H02M 7/493 363/20 |
| 2019/0128555 A1 * | 5/2019 | Takeda .................... | H02M 1/12 |

FOREIGN PATENT DOCUMENTS

| EP | 2579451 | 3/2016 |
|---|---|---|

* cited by examiner

*Primary Examiner* — Jue Zhang
(74) *Attorney, Agent, or Firm* — Gennadiy Vinokur; Hironori Tsukamoto

(57) ABSTRACT

A controller is provided for generating carrier signals for a PWM generator controlling an inverter driving an electric actuator to reduce the EMI level of the inverter. The controller includes an interface configured to connect to the inverter, a memory configured to store a measured electromagnetic-interference (EMI) spectrum, a desired EMI spectrum and an EMI suppression rate program, and a processor. The processor is, in connection with the memory, configured to computing EMI suppression rates for a frequency range, wherein the EMI suppression determined adaptively by the measured EMI spectrum and the desired EMI spectrum, computing sweep duration of discrete frequency, wherein the sweep duration is determined by the EMI suppression rate of the discrete frequency, and a modulator configured to modulate the carrier signals based on the sweep durations of carrier frequencies and to transmit the modulated carrier signals to the PWM generator to generate PWM signals for the inverter.

24 Claims, 10 Drawing Sheets

EMI REDUCTION IN PWM INVERTERS USING ADAPTIVE FREQUENCY MODULATED CARRIERS

FIELD OF THE INVENTION

The present invention is related to EMI reduction of PWM inverters, and more particularly to reducing electromagnetic interference of PWM inverters by using a deterministic frequency modulation carrier.

BACKGROUND & PRIOR ART

Pulse Width Modulation (PWM) inverters are widely used in modern motor driving systems due to their high efficiency and wide range of adjustable output frequency. However, PWM inverters may cause some side effects such as motor bearing current, over voltage at motor terminals, and electromagnetic interference (EMI), because of dv/dt and di/dt in their frequent switching operations driven by PWM signals. In particular, PWM inverters that use periodic triangular or sinusoidal carriers to generate PWM driving signals, simultaneously generate harmonics of the carrier's frequency. Consequently, these carrier harmonics contribute the main conducted EMI in the frequency spectrum, which may lead to mis-operation or fail to meet the required EMC standards.

In some cases, PWM inverters cause serious EMI issues because of their frequent switching operations driven by PWM signals. In particular, PWM inverters that use periodic triangular or sinusoidal carriers to generate PWM driving signals simultaneously generate harmonics of the carriers as EMI.

Accordingly, there is a need to develop a controller or a signal processor which can effectively reduce the serious EMI issues caused by PWM inverters.

SUMMARY OF THE INVENTION

By analyzing the main EMI source from signal-processing perspective and the present disclosure provides a method to use deterministic frequency modulation (FM) carriers instead of conventional periodic triangular or sinusoidal carrier, or random frequency modulation carrier to generate PWM driving signals, and consequently to reduce the EMI level. We examined linear frequency modulation (FM) and nonlinear adaptive FM carrier to achieve desired EMI spectrum with negligible low-frequency distortion in the inverter output waveform. The present invention provides a novel EMI reduction scheme where the carrier frequency is adaptively modulated to reduce EMI level of harmonics within a certain frequency range.

Random carrier frequency modulation (RCFM) has been demonstrated effective to reduce electromagnetic interference (EMI) level for Pulse Width Modulation (PWM) inverters. In this disclosure, we propose a novel EMI reduction scheme using deterministic frequency modulation techniques instead of RCFM. In particular, we first propose a linear frequency modulation (LFM) method to spread the source harmonic energy uniformly out in a certain frequency range. Considering the characteristics of the EMI propagation path, we propose a nonlinear frequency modulation (NFM) method to adaptively modulate the frequency of the carrier signal such that the influence of propagation can be compensated, leading to a reduced EMI level at the victim. Simulation and experimental results show that we can achieve a desired flat EMI spectrum in a certain frequency range by adaptively modulating carrier signal's frequency.

In order to reduce the EMI level of PWM inverters to victims, various of schemes have been proposed from different perspectives including EMI source, propagation path, and EMI victims. For example, filtering is the most commonly used method to suppress conducted EMI such that the conducted EMI to the victim is significantly reduced. As another example, shielding method aims at reducing the radiated EMI by blocking the radiation path. Some other methods aim to reduce EMI from its source, such as multi-level inverter and soft-switching techniques. All these methods require extra hardware to implement in practice.

Besides the above classical EMI suppression or reduction methods, random carrier frequency modulation (RCFM) also attracts great attention to suppress EMI as well as acoustic noise. It is well known that the EMI spectrum of PWM inverters includes strong spikes of carrier harmonics. By randomizing the switching time in a very narrow time range, the EMI harmonic energy can be spread out in the frequency domain, resulting a lower EMI spectrum. Consequently, the requirement of EMI filters is also reduced. However, RCFM works well only in a statistical way, or with a probability.

Following the idea of spreading EMI spectrum, the present disclosure provides two deterministic modulation methods to reduce EMI. First, we proposed a linear frequency modulation (LFM) method to uniformly spread the EMI spectrum from signal-processing perspective such that the EMI source generates a flat spectrum in a certain range. Second, considering that the EMI propagation path from the EMI source to a victim under test is very complicated and the EMI level received by the victim is not necessarily flat as desired, we proposed a nonlinear frequency modulation (NFM) method in which we adaptively modulate frequency based on the EMI spectrum of LFM carrier to compensate the propagation distortion and to achieve a desired flat EMI spectrum.

Some embodiments of the present disclosure show the simulation and experimental results demonstrating the effectiveness of our proposed methods.

According to some embodiments of the present disclosure, a controller for generating carrier signals controlling an inverter driving an electric actuator is provided. The controller may include an interface configured to connect to a victim circuit, wherein the victim circuit may include the power system and the electric actuator; a memory configured to store a modulation frequency range, a measured electromagnetic-interference (EMI) spectrum, a desired EMI spectrum and an EMI suppression rate program; and a processor, in connection with the memory. The processor is configured to perform computing EMI suppression rates for the frequency range, wherein the EMI suppression rates are determined by the measured EMI spectrum and the desired EMI spectrum; computing sweep duration of discrete frequency, wherein the sweep duration is determined by the EMI suppression rate of the discrete frequency; and a modulator configured to modulate the carrier signals based on the sweep durations of discrete frequencies and to transmit the modulated carrier signals via the interface.

Further, another embodiment of the present disclosure can provide a signal processor for generating modulation parameters to be used by a signal modulator that generates carrier signals controlling an inverter driving an electric actuator. The signal processer may include an interface configured to connect to a signal modulator; a memory configured to store a modulation frequency range, a measured electromagnetic-interference (EMI) spectrum, a desired EMI spectrum and an EMI suppression rate program; and a processor, in connection with the memory. The processor is configured to perform steps of computing EMI suppression rates for a frequency range, wherein the EMI suppression rates are determined by the measured EMI spectrum and desired EMI spectrum; computing sweep duration of discrete frequency, wherein the sweep duration is determined by the EMI suppression rate of the discrete frequency; generating the modulation parameters based on the sweep durations of discrete frequencies; and transmitting the modulation parameters to the signal modulator.

BRIEF DESCRIPTION OF THE DRAWING

The accompanying drawings, which are included to provide a further understanding of the invention, illustrate embodiments of the invention and together with the description serve to explain the principle of the invention.

DETAILED DESCRIPTION OF THE PREFERRED EMBODIMENTS

Figure 1:
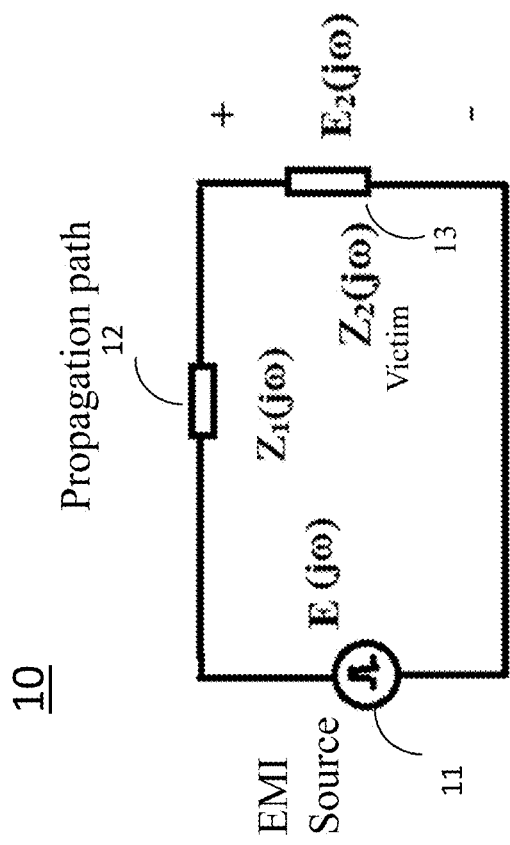
FIG. 1 shows a schematic illustrating EMI propagation, according to embodiments of the present disclosure.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

PWM Carrier AND EMI

In power electronics, the PWM waveform is generated by a PWM comparator with two input waveforms. One is the reference signal (modulation signal), which is typically a sinusoidal signal of desired reference frequency. The other is the carrier signal, which can be a sinusoidal or triangular signal of much higher carrier frequency than the reference frequency.

Periodic Carrier

Let $f_c$ be the carrier frequency and $f_r$ be the reference frequency. The sine carrier signal can be represented by $$c_S(t) = A \sin \phi_c(t) = A \sin\{2\pi f_c t + \phi_0\}, \quad (1)$$

where A is the amplitude, $\phi_c(t) = 2\pi f_c t + \phi_0$ is the phase of the sine carrier signal, and $\phi_0$ is the initial phase. Correspondingly, the triangular carrier signal that shares the same peak values of (1) can be represented by $$c_T(T) = A \left[ 2 \frac{\phi_c(t)}{\pi} - 2 \left\lfloor \frac{\phi_c(r)}{\pi} + \frac{1}{2} \right\rfloor \right] (-1)^{\lfloor \frac{\phi_c(t)}{\pi} + \frac{1}{2} \rfloor}, \quad (2)$$

where $\lfloor \cdot \rfloor$ is the floor function that gives the greatest integer less than the input real number as output. The output PWM waveform includes harmonics related to both the reference frequency and the carrier frequency. Further Fourier analysis of the PWM waveform shows that the harmonic frequency will be $(nf_c \pm k f_r)$, where n and k are non-negative integers. When n=0 and k=1, the harmonic corresponds to the fundamental frequency $f_r$ of PWM output. After a low-pass filtering process, the harmonic frequency components are suppressed, and a nearly perfect sinusoidal signal of the reference frequency can be achieved. However, although most of the harmonics are suppressed, they still cause conducted or radiated EMI.

Linear Frequency Modulation (LFM) Carrier

Random frequency modulation carrier (RCFM) has been proved to be an effective way to spread the harmonic energy out in a frequency range and consequently lower down the EMI level. However, the RCFM only provides improved performance statistically, not in a deterministic way. Since the carrier frequency is randomly modulated, the PWM inverter may perform differently when a different random modulation is employed.

To avoid this problem, we consider deterministic frequency modulation methods to reduce the EMI instead of random frequency modulation. First, we consider a linear frequency modulation (LFM) carrier.

Linear frequency modulation signals have been widely used in communication and radar areas. For example, the up-chirp signal with a linear frequency modulation used in radar systems has a flat spectrum in the spanned frequency range. Therefore, if we use an LFM carrier, we can expect to spread the EMI spectrum energy out in the carrier's frequency range.

Let the time-domain carrier signal be $$c_{LS}(t) = A \sin \phi_{LM}(t) = A \sin\{2\pi[u(t)f_a + f_b]t' + \phi_0\}, \quad (3)$$

where $\phi_{LM}(t)$ is the phase of the linear frequency modulation sine carrier, $f_a$ and $f_b$ are two frequency parameters, and u(t) is a sawtooth signal of period T. We can write u(t) as $$u(t) = 2 \left[ \frac{t}{T} - \left\lfloor \frac{t}{T} \right\rfloor \right] - 1, \quad (4a)$$

$$\text{and } t' \text{ as } t' = t - \left\lfloor \frac{t}{T} \right\rfloor T = \frac{u(t)+1}{2} T, \quad (4b)$$

such that $c_{LS}(t)$ is of period T.

The linear modulated frequency $f_{LM}(t)$ can be formulated as $$f_{LM}(t) = \frac{1}{2\pi}\frac{\partial \phi_{LM}(t)}{\partial t} = 2u(t)f_a + f_a + f_b. \quad (5)$$

We can see that $f_{LM}(t)$ has a sweep period of T, i.e. $f_{LM}(t+mT)=f_{LM}(t)$ for any integer number m. The carrier's frequency range is $$[f(0),f(T)]=[f_b-f_a,f_b+3f_a]=[f_{min},f_{max}]. \quad (6)$$

In each sweep period, we can monotonically increase the carrier frequency from $f_{min}$ to $f_{max}$ according to $f_{LM}(t)$, or decrease the carrier frequency from $f_{max}$ to $f_{min}$ according to $f'_{LM}(t)=f_{LM}(T-t)$. Both frequency modulation methods have the same EMI reduction performance. It is clear that given a fixed EMI energy, the wider the frequency modulation range, the lower the EMI level. However, in practice the frequency range is limited by various kinds of constraints. The lowest frequency $f_{min}$ is typically constrained by the total harmonic distortion (THD) of output voltage and current, and the highest switching frequency $f_{max}$ is restricted by switching devices. Once $f_{min}$ and $f_{max}$ are determined, parameters $f_a$ and $f_b$ can be solved according to (6).

The linear modulated frequency $f_{LM}(t)$, carrier's phase $\phi_{LM}(t)$, and carrier signal $c_{LS}(t)$ can be rewritten respectively as $$f_{LM}(t) = u(t)\frac{f_{max} - f_{min}}{2} + \frac{f_{max} + f_{min}}{2}, \quad (7)$$

$$\phi_{LM}(t) = \quad (8)$$
$$2\pi \int_0^t f_{LM}(t)dT = 2\pi\left[u(t)\frac{f_{max} - f_{min}}{4} + \frac{f_{max} + 3f_{min}}{4}\right]t' + \phi_0,$$

and $$c_{LS}(t) = \quad (9)$$
$$A\sin(\phi_{LM}(t)) = A\sin\left\{2\pi\left[u(t)\frac{f_{max} - f_{min}}{4} + \frac{f_{max} + 3f_{min}}{4}\right]t' + \phi_0\right\}.$$

The bandwidth of the carrier frequency is $$BW = f_{max} - f_{min}. \quad (10)$$

The central frequency $f_{ct}$ is $$f_{ct} = \frac{f(T) + f(0)}{2} = \frac{f_{max} + f_{min}}{2}. \quad (11)$$

The equivalent frequency that causes the same number of switching operations can be presented as $$f_{eq} = \frac{\phi_{LM}(T) - \phi_{LM}(0)}{2\pi T} = \frac{f_{max} + f_{min}}{2}. \quad (12)$$

To achieve frequency modulation triangular carrier signal, we simply replace $\phi_c$ in equation (2) with $\phi_{LM}$ in equation (8) as follows, $$c_{LT}(t) = A\left[2\frac{\phi_{LM}(t)}{\pi} - 2\left\lfloor\frac{\phi_{LM}(t)}{\pi} + \frac{1}{2}\right\rfloor\right](-1)^{\left\lfloor\frac{\phi_{LM}(t)}{\pi} + \frac{1}{2}\right\rfloor}. \quad (13)$$

Nonlinear Frequency Modulation (NFM) Carrier

In the previous sub-section, we design a linear frequency modulation carrier to spread harmonic energy out in the spanned frequency range. However, this spread harmonic EMI energy is uniformly distributed only at the inverter output, or the EMI source.

FIG. 1 shows a modelled circuit 10 illustrating the EMI propagation, according to embodiments of the present disclosure. The modelled circuit 10 includes an EMI source 11 represented by $E(j\omega)$, propagation paths 12 represented by equivalent series impedance $Z_1(j\omega)$ and a victim 13 including a series impedance $Z_2(j\omega)$.

Considering the characteristics of propagation paths 12, the EMI spectrum received at the victim 13 is generally not flat anymore. To further investigate the influence and propagation paths 12, we simplify the EMI propagation to an equivalent circuit including an EMI source $E(j\omega)$, an equivalent series impedance $Z_1(j\omega)$ of EMI source and propagation paths, and a series impedance $Z_2(j\omega)$ of victim or LISN, where $\omega=2\pi f$ is the angular frequency.

The EMI received by the victim is $$E_2(j\omega) = \frac{z_2(j\omega)}{z_1(j\omega) + z_2(j\omega)} \times E(j\omega). \quad (14)$$

Since the EMI propagation path is very complicated and the impedances $Z_1(j\omega)$ and $Z_2(j\omega)$ are frequency dependent, the victim EMI $E_2(j\omega)$ is not linearly proportional to the EMI source $E(j\omega)$ across the whole frequency range. In order to achieve a desired EMI magnitude spectrum $E_2(j\omega)$ at the victim side, we propose a non-linear frequency modulation scheme to adaptively modulate the carrier's frequency. By this means, the EMI spectrum at the source $E(j\omega)$ is pre-distorted and no longer flat. The spectrum distortion is compensated by the propagation, resulting a flat EMI spectrum $E_2(j\omega)$ at the victim.

Let the victim EMI power spectrum corresponding to a linear frequency modulation carrier be M(f), where $f\in[f_{min}, f_{max}]$, and a desired victim EMI power spectrum be D(f). Note that here we use power spectrum instead of magnitude spectrum to simplify the following inferences. Since carrier frequency modulation will not change the total number of switching operations, but only dither the time of each switching operation, the total EMI emission energy remains the same. Therefore, for discrete uniform frequency samplings $[f_1=f_{min}, f_2, f_3, \ldots, f_N=f_{max}]$, we have $$\sum_{i=1}^{N} M(f_i) = \sum_{i=1}^{N} D(f_i). \quad (15)$$

It is straightforward to prove that peak EMI level satisfies $$\max_{f_i}(M(f_i)) \geq \mathrm{mean}_{f_i}(M(f_i)) = D(f_i) = \max_{f_i}(D(f_i)). \quad (16)$$

Therefore, the peak EMI level is minimized when the desired EMI spectrum 15 flat.

Let the nonlinear modulated frequency be $f_{NM}(t_i)=f_i$, of the same sweep period T and the same sweep frequency range. For each sweep period we monotonically increase the carrier frequency from $f_{min}$ to $f_{max}$. For simplicity, we consider the first sweep period and at time $t_i(0=t_1 \leq t_i \leq t_N=T)$ the frequency $f_i$ is swept. It is clear that the sweep duration of frequency $f_i$ will proportionally impact the EMI spectrum energy at frequency $f_i$. Based on this knowledge, we define a weight function $w(f_i)$ as follows, $$w(f_i) = \alpha\left(t_{i+\frac{1}{2}} - t_{i\frac{1}{2}}\right) = \alpha\left[t\left(\frac{f_{i+1}+f_i}{2}\right) - t\left(\frac{f_i+f_{i-1}}{2}\right)\right] \quad (17)$$

such that $$M(f_i)w(f_i)=D(f_i), \quad (18)$$

where $\alpha$ is an unknown constant to be determined. We call this weight function as EMI suppression rate function. With boundary conditions $$r_{\frac{1}{2}} = t_1 = 0 \text{ and } t_{N+\frac{1}{2}} = t_N = T,$$

we get from (17) that $$\sum_{i=1}^{i=N} w(f_i) = \alpha T. \quad (19)$$

According to (17), (18), and (19), we have $$t_{i+\frac{1}{2}} = t_{i-\frac{1}{2}} + T\frac{1/M(f_i)}{\sum_{i=1}^{i=N} 1/M(f_i)}, i = 1, \ldots, N-1. \quad (20)$$

Then the frequency is modulated adaptively according to $$f_{NM}\left(t_{i+\frac{1}{2}}\right) = \frac{f_i + f_{i+1}}{2}, \quad (21)$$

where the time $$t_{i+\frac{1}{2}}$$

is determined by (20). For time $$t \in \left[T_{i-\frac{1}{2}}, t_{i+\frac{1}{2}}\right],$$

the frequency is modulated linearly, i.e., $$f_{NM}\left(t_{i-\frac{1}{2}} \leq t \leq t_{i+\frac{1}{2}}\right) = \frac{f_{i-1}+f_i}{2} + \frac{t - t_{i-\frac{1}{2}}}{t_{i+\frac{1}{2}} - t_{i-\frac{1}{2}}} \cdot \frac{f_{i+1}-f_{i-1}}{2}. \quad (22)$$

From (20) we can see that the sweep duration of frequency $f_i$ is inversely proportional to the corresponding EMI energy $M(f_i)$. Consequently, frequency that has a small spectrum energy at linear frequency modulation will have a long sweep time in nonlinear frequency modulation to accumulation more spectrum energy, and vice versa. This nonlinear frequency modulation results uniformly distributed spectrum in a certain frequency range, and therefore a minimized EMI level.

Similar to linear frequency modulation, in each sweep period, we can monotonically increase the carrier frequency from $f_{min}$ to $f_{max}$ according to $f_{NM}(t)$, or decrease the carrier frequency from $f_{max}$ to $f_{min}$ according to $f'_{NM}(t)=f_{NM}(T-t)$, with the same EMI reduction performance.

Note that this nonlinear frequency modulation relies only on the EMI spectrum using linear frequency modulation, in which the propagation characteristics are included, not on any circuit parameters. Therefore, this nonlinear frequency modulation scheme can be applied to different equipment adaptively reduce the EMI level by nonlinear frequency modulation.

Once we have $f_{NM}(t_i)=f_i$, we can get carrier's phase by $$\phi_{NM}(t_j) = 2\pi \int_0^{t_j} f_{NM}(t)dt, \quad (23)$$

where $0 \leq t_j \leq T$. For any time t, we have general expressions of the carrier's phase $$\phi_{NM}(t) = \phi_{NM}\left(T\left(\frac{t}{T} - \left\lfloor\frac{t}{T}\right\rfloor\right)\right), \quad (24)$$

the NFM sine carrier $$c_{NS}(t) = A \sin[\phi_{NM}(t)] \quad (25)$$

and the NFM triangle carrier $$c_{NT}(t) = A\left[2\frac{\phi_{NM}(t)}{\pi} - 2\left\lfloor\frac{\phi_{NM}(t)}{\pi} + \frac{1}{2}\right\rfloor\right](-1)^{\left\lfloor\frac{\phi_{NM}(t)}{\pi} + \frac{1}{2}\right\rfloor}. \quad (26)$$

Figure 2A:
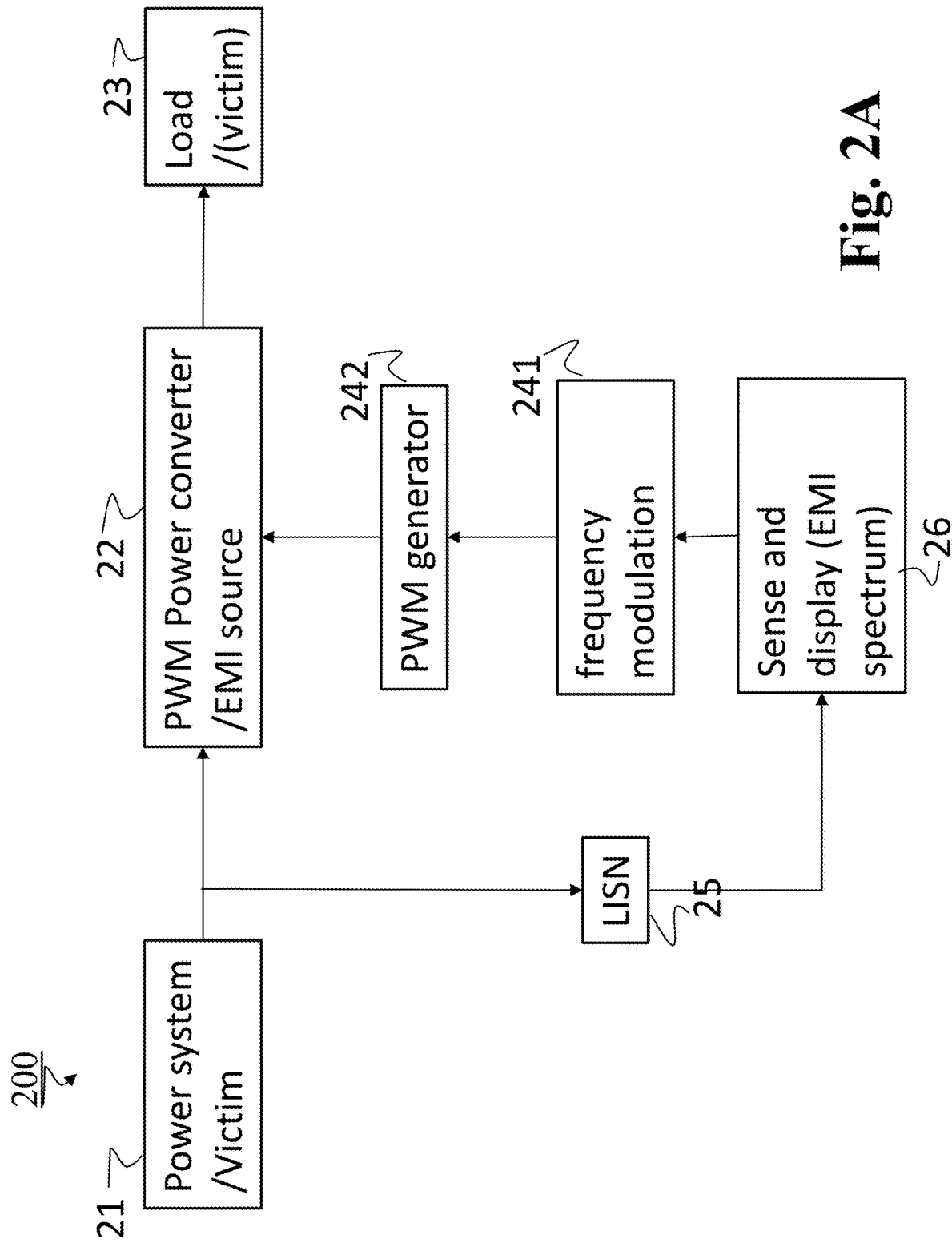
FIG. 2A shows a schematic diagram indicating signal processing steps for reducing EMI in a PWM inverter, according to embodiments of the present disclosure.

FIG. 2A shows a schematic diagram indicating a signal processing method 200 for reducing EMI in a PWM inverter according to some embodiments of the present disclosure. The signal processing method 200 uses a power system/victim 21, a PWM Power converter/EMI source 22, a load 23, an LISN 25, a sensor and display (module) 26, a frequency modulator 241 for modulation of signals and a PWM generator 242. In this case, the PWM Power converter 22 converts the power source provided by the power system 21 into the power form required by the load 23. During the power converting process, the PWM power converter also generates EMI as an EMI source. EMI propagates through different paths to the power system and the load. Therefore, in some cases, the power system 21 and the load 23 are victims of the EMI source. The LISN 25 provides a stable line impedance across a wide frequency range such that the EMI received by the power system/victim 21 can be properly measured according to EMI measurement standards. The LISN 25 provides the EMI spectrum M(f) to the sense/display 26 that is configured to acquire EMI signal propagated from the PWM Power converter/EMI source 22 to the power system/victim 21. The frequency modulator 241 is configured to provide the modulated signals to the PWM generator 242 according to M(f) and desired flat spectrum D(f), and the PWM generator 242 generates PWM signals based on the frequency modulated signals and provides the PWM signals to the PWM power converter/EMI source 22. The PWM power converter/EMI source 22 is configured to convert power to the form required by the load 23 with a reduce EMI level.

Figure 2B:
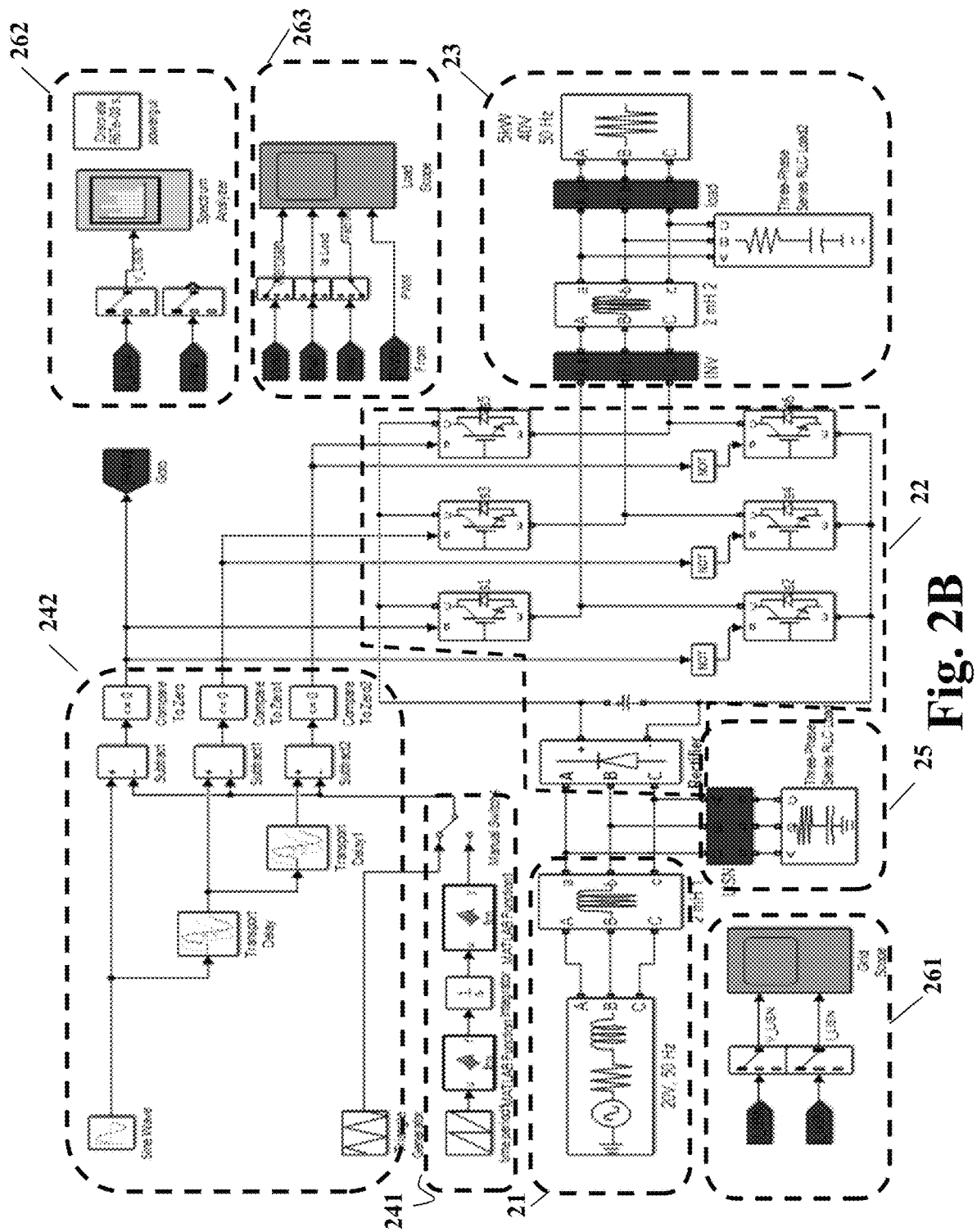
FIG. 2B shows a schematic illustrating a Diagram of PWM inverter used in simulation, according to embodiments of the present disclosure.
Figure 3B:
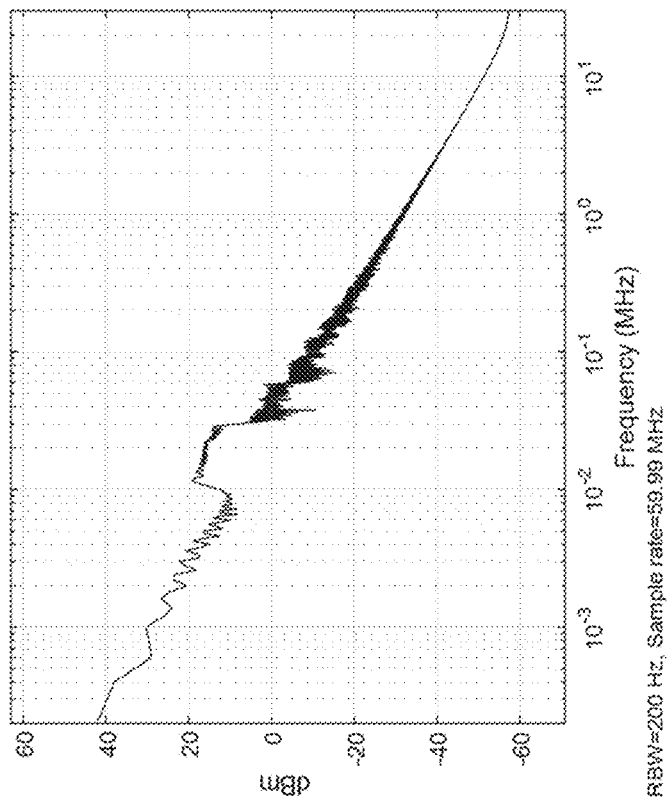
FIGS. 3(a)-3(d) show power spectra for different carriers, according to embodiments of the present disclosure.
Figure 3A:
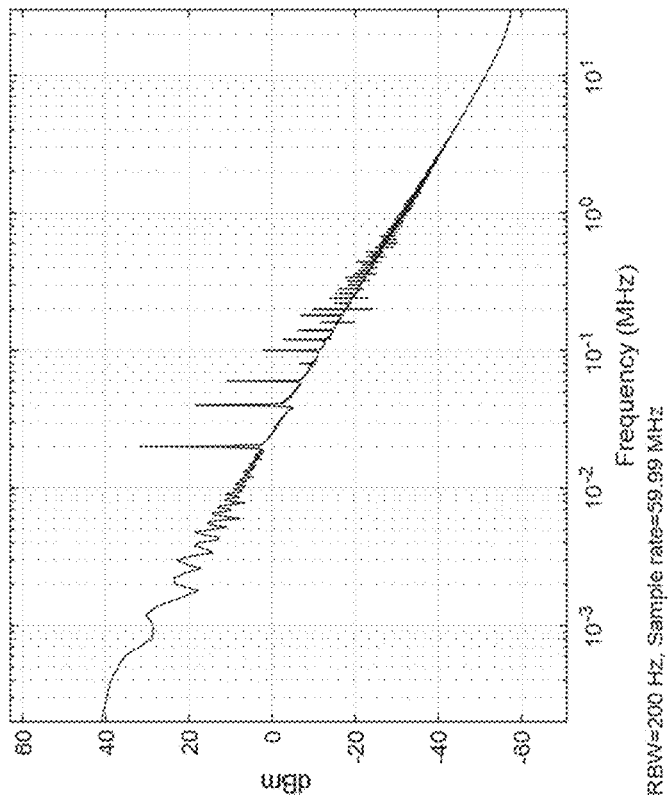
Figure 3D:
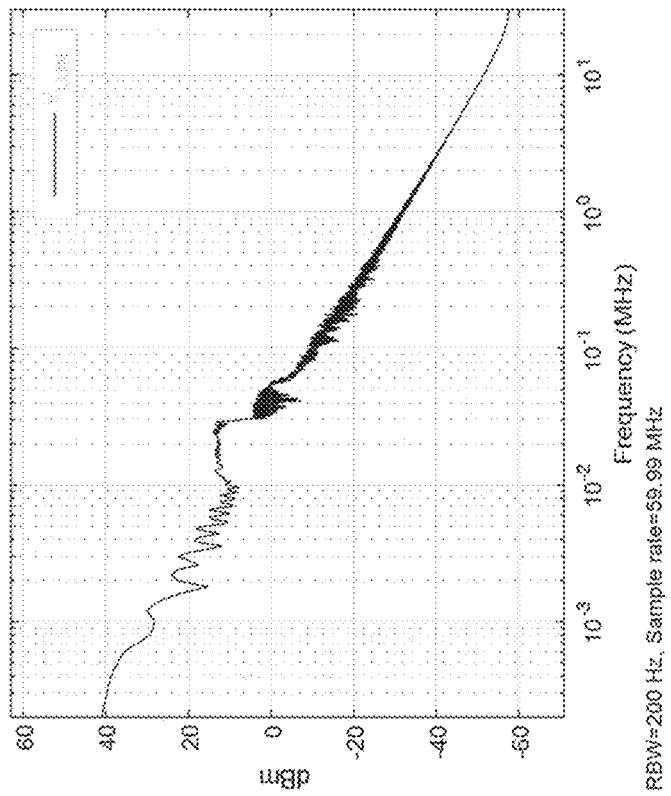
Figure 3C:
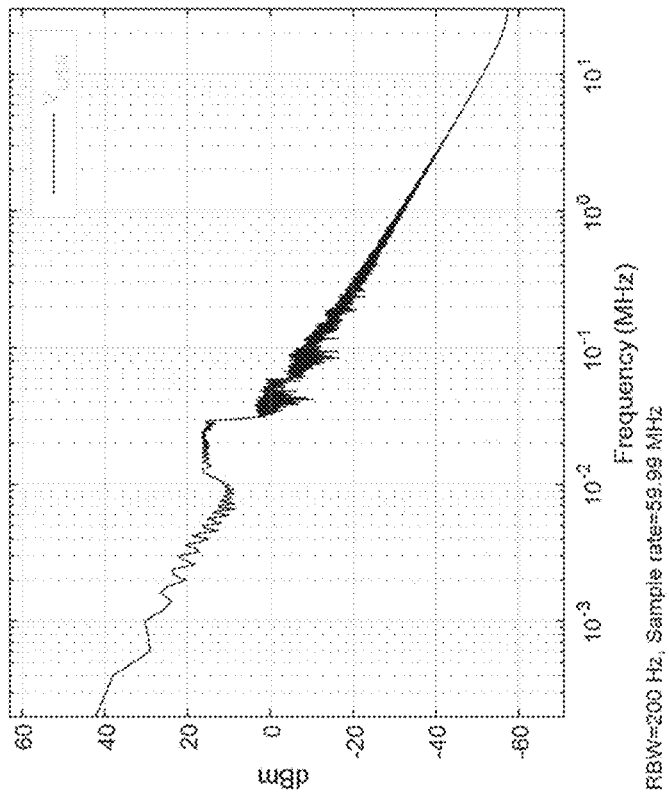

FIG. 2B shows a schematic illustrating circuit modules including a Diagram of an AC power source 21, an AC/DC rectifier and a PWM inverter 22, and an LRC load 23 used in a simulation according to some embodiments of the present disclosure.

PWM signals are generated by comparing reference sine waves and carrier signal 242, to control the switching operations of the power inverter 22 such that a power form required by the load 23 can be achieved. The carrier signal can be periodic triangle signal or frequency modulation signal 241 with manual switch in the simulation. The voltage and current of LISN 25 are measured in scope 261, the LISN EMI spectrum is measured in spectrum analyzer 262, and load voltage and current are measured in scope 263.

To evaluate our method, we perform simulation on a three-phase PWM inverter, with schematic diagram shown in the figure. We can simulate the waveforms and EMI spectrum measured using a line impedance stabilization network (LISN) and a circuit simulator, such as Matlab Simulink. We use resolution bandwidth RBW=200 Hz and sampling rate 60 MHz to analyze conducted EMI spectrum. For comparison, we consider a 20 kHz triangular carrier and a linear frequency modulation carrier of the equivalent frequency $f_{eq}$=20 kHz, in the rage of [10 kHz, 30 kHz], with a sweep period T=5 ms. Therefore, we can get carrier signal as shown in equation (9) with parameters $f_{min}$=10 kHz and $f_{max}$=30 kHz.

FIG. 3(*a*) shows the simulated EMI spectrum of the LISN when a periodic triangular carrier is used. From the spectrum, we can clearly observe harmonic peaks at frequency $nf_c$, where n=1, 2, 3, . . . . For each of these harmonic peaks, we also observe some small side lobes which can be represented as ($nf_c \pm kf_r$).

FIG. 3(*b*) shows an EMI power spectrum using LFM since carrier, according to some embodiments of the present disclosure. When we use a linear frequency modulation sine carrier of frequency ranging from 10 kHz to 30 kHz, the harmonic spectra are spread out in the corresponding frequency ranges, as shown in the figure.

We notice that the corresponding harmonic EMI level is reduced from 32.1 dBm to 19.1 dBm by 13 dB. However, we notice that although EMI energy is spread out in the sweep frequency range, the spread EMI spectrum is not flat due to the propagation impedance characteristics. This non-uniformly distributed EMI energy provides us an opportunity to reduce the EMI level further. In order to achieve a desired flattened EMI spectrum, we adopt adaptive FM scheme on a sine carrier, with the same frequency modulation range.

FIG. 3(*c*) shows an EMI power spectrum using adaptive NFM sine carrier, according to embodiments of the present disclosure. In this case, the adaptive FM sine carrier is used, and it shows that the EMI spectrum in the range of [10 kHz, 30 kHz] is flattened to 16.7 dBm with 2.4 dB more reduction compared to that shown in FIG. 3(*b*). At the same time, there is no noticeable change in the lower frequency range, which means the fundamental frequency is not influenced.

FIG. 3(*d*) shows EMI power spectrum using adaptive NFM triangular carrier, according to some embodiments of the present disclosure. When the adaptive FM sine carrier is changed to adaptive FM triangular carrier, the EMI level is reduced to 13.9 dBm, as shown in the figure. We can see that 2.8 dB reduction is achieved, leading to a total of 18.2 dB EMI reduction compared to that shown in FIG. 3(*a*) without any frequency modulation.

To further evaluate the influence of our EMI reduction scheme to the fundamental frequency component and its harmonics, we simulate the frequency spectrum of inverter output line-to-line voltage in a low range frequency of [0 Hz, 10 kHz] using Matlab Simulink with RBW=1 Hz.

Figure 4:
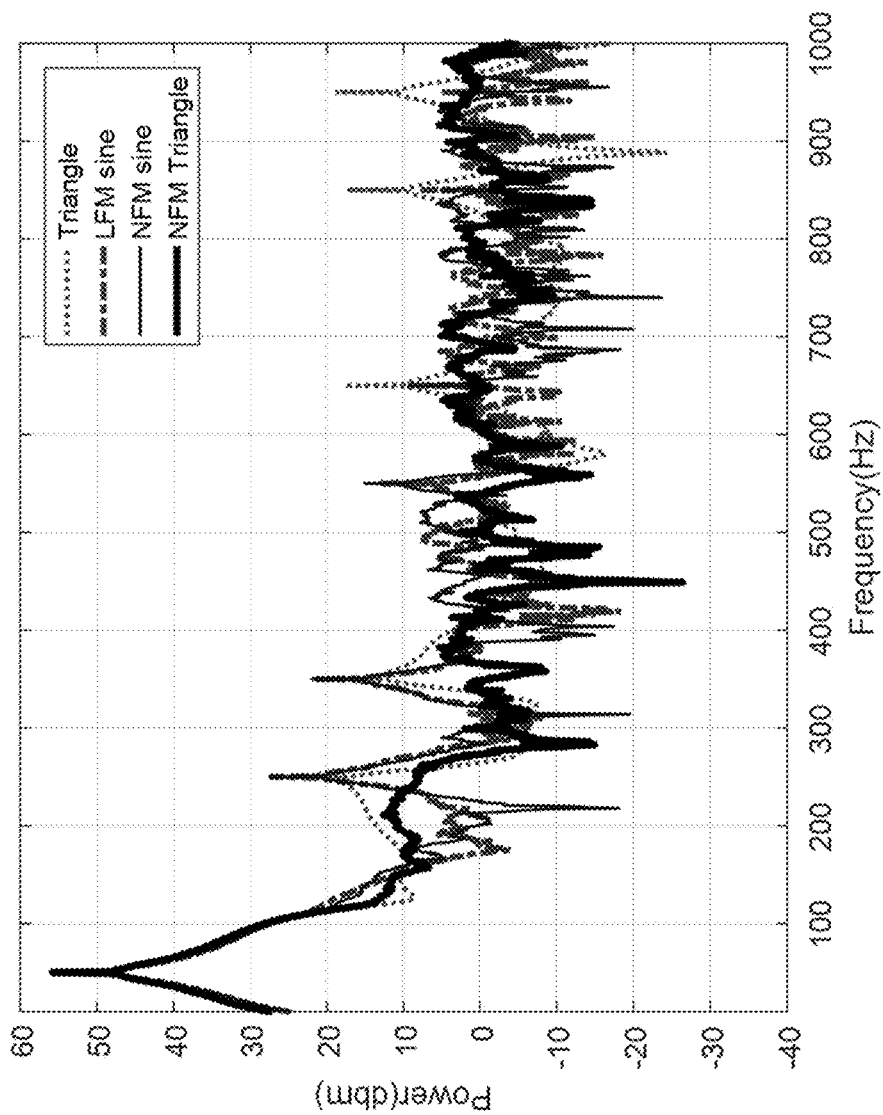
FIG. 4 is an example showing comparison of harmonics of fundamental frequency component, according embodiments of the present disclosure.

FIG. 4 is an example showing comparison of harmonics of fundamental frequency component according some embodiments of the present disclosure. In the figure, we plot the power spectra only in the range of [0 Hz, 1 kHz] for a better visual quality. We observe that the $5^{th}$, $7^{th}$, $11^{th}$, and $13^{th}$ order harmonics are significantly suppressed by using our proposed nonlinear frequency modulation triangular carrier. To further quantitatively analyze the performance, we compute the total harmonic distortion (THD) for different carrier signals using equation, $$THD = \frac{\sqrt{\sum_{j=2}^{200} V_j^2}}{V_1} \times 100\%, \qquad (27)$$

where $V_j$ is the RMS voltage of the $j^{th}$ harmonic and j=1 is the fundamental frequency of 50 Hz. The THDs of the triangle carrier, LFM sine carrier, NFM sine carrier, and NFM triangle carrier are 7.9%, 6.6%, 6.7%, and 4.8%, respectively. It is clear that the NFM triangle carrier yields the best performance with respect to THD.

Example of Configuration

Figure 5:
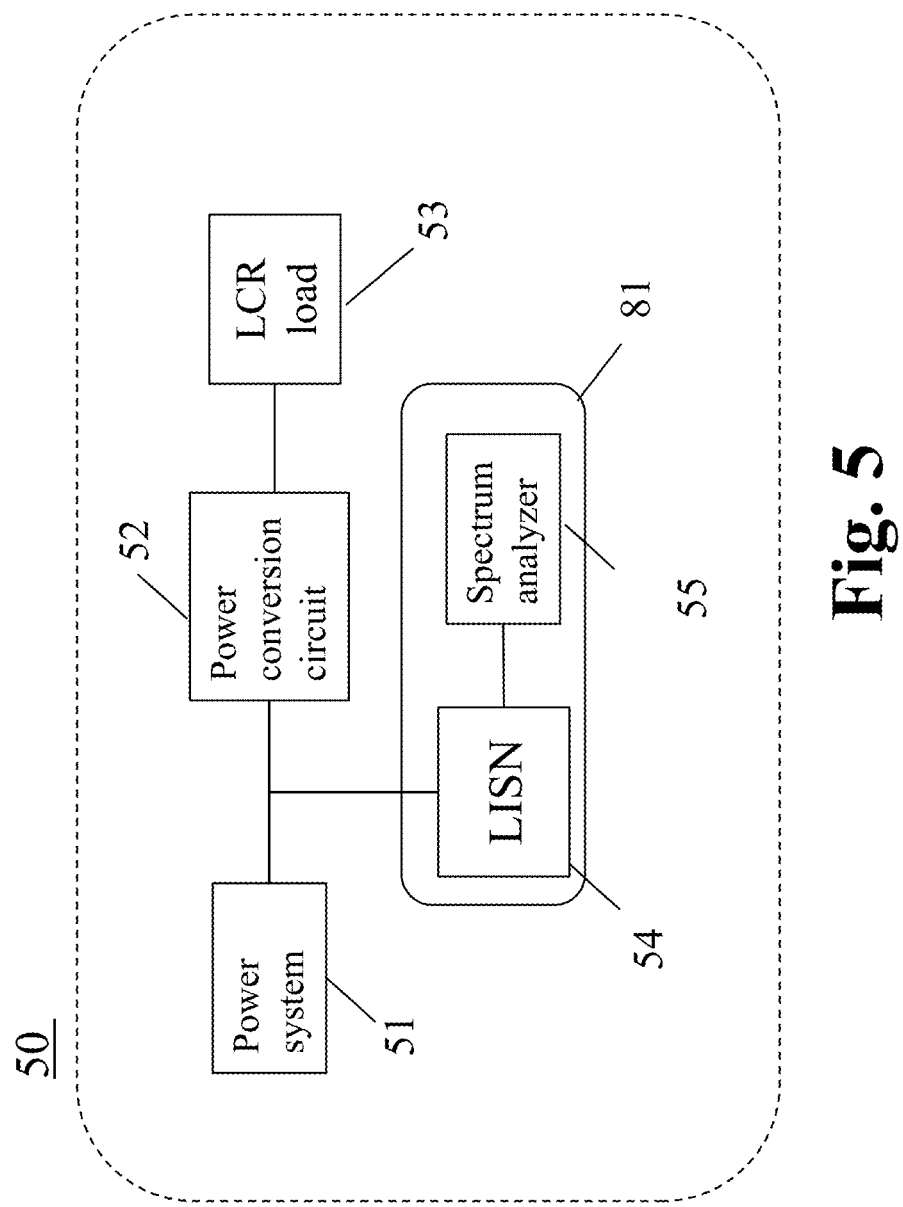
FIG. 5 is an example setup illustrating a measurement system connected to a power conversion circuit and LCR load, according embodiments of the present disclosure.

FIG. 5 is an example setup illustrating a measurement system 50 connected to a power conversion circuit and LCR load according some embodiments of the present disclosure. We carried out an experiment on a three-phase 3 kW PWM inverter. The measurement system 50 includes a power system 51, a power conversion circuit 52, an LCR load 53, and a sensor unit (or sensor) 81 that includes an LISN (line impedance stabilization network) 54 and a spectrum analyzer 55. The PWM power conversion circuit 52 is configured to provide power for an LCR load 53.

The LISN 54 provides a stable line impedance across a wide frequency range such that the EMI received by the power system 51 can be properly measured according to EMI measurement standards. The LISN 54 provides the EMI spectrum M(f) to the spectrum analyzer 55 that is configured to acquire EMI signal propagated from the PWM Power converter/EMI source 52 to the power system 51.

The frequency of the PWM triangle carrier may be in a range between 1 kHz and 100 kHz. In the present experiment, the frequency of the PWM triangle carrier is set to 10.5 kHz. For FM carrier, we set a frequency range of [1 kHz, 20 kHz]. A spectrum analyzer 55 is used to measure the conducted EMI from 10 kHz to 30 MHz via a LISN 54 for both triangle carrier and FM carrier, under the same operating condition. For instance, Rohde&Schwarz (ESR7) can be used as the spectrum analyzer 55.

Figure 6:
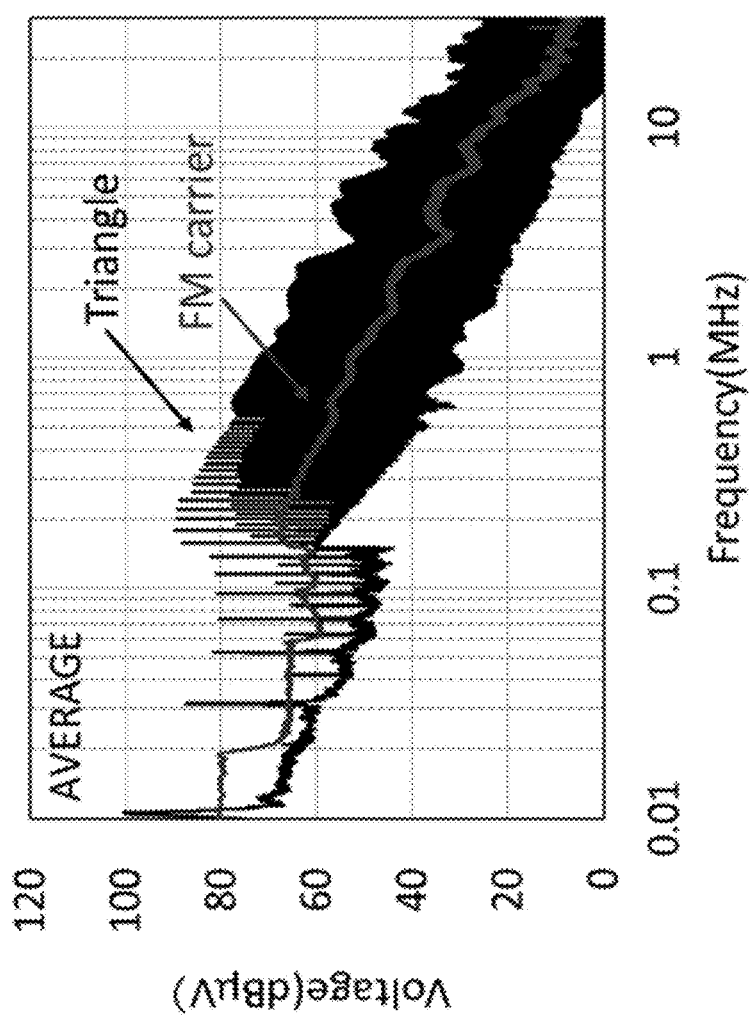
FIG. 6 is a measurement example showing comparison of EMI power spectra using triangle and FM carriers, according embodiments of the present disclosure.

The measured EMI spectra are shown in FIG. 6 for comparison, where the black spectrum is measured when a triangular carrier is used for PWM driving signal, and the red spectrum is measured when a linear frequency modulation carrier is used for PWM driving signal, respectively. We can observe that the EMI spectrum of an LFM carrier is lower than that of a triangular carrier by about 20 dB. This EMI reduction demonstrate that we can reduce EMI level using frequency modulation carrier for PWM signals.

We proposed two deterministic carrier frequency modulation (FM) methods, a linear frequency modulation (LFM) method and a nonlinear adaptive frequency modulation (NFM) one, instead of random carrier frequency modulation (RCFM) to reduce conducted EMI in PWM inverters. We demonstrate by simulations that with LFM, we can reduce the harmonic EMI level by spreading out the EMI energy in a certain frequency range. More importantly, EMI as well as harmonics of fundamental frequency components can be further reduced with NFM by adaptively modulating the frequency of a triangular carrier, based on the EMI spectrum using LFM. We validate our proposed scheme with Matlab Simulink simulations. Although a three-phase inverter is used to demonstrate our proposed methods for EMI reduction as an example, the number of phases is not limited to three phases, the proposed methods can be applied to any inverters operating more than three phases (at least three phases).

Figure 7:
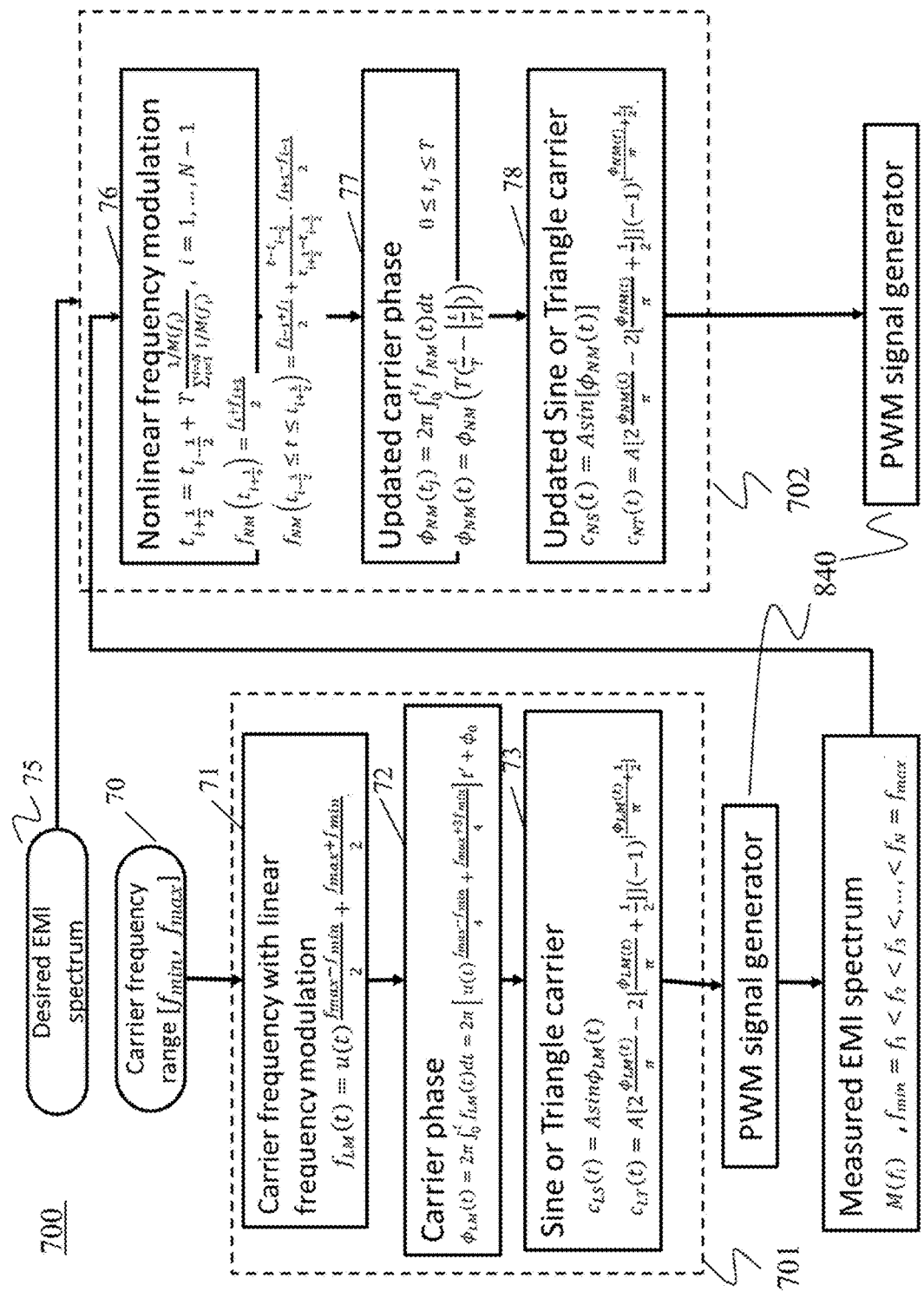
FIG. 7 shows a flowchart describing the process steps for generating frequency modulation carrier signals, according embodiments of the present disclosure.

FIG. 7 shows a flowchart 700 describing the process steps for generating frequency modulation carrier signals according some embodiments of the present disclosure.

The flowchart 700 starts with input of a carrier frequency range represented by a minimum frequency $f_{min}$ and a maximum frequency $f_{max}$ in step 70. In some cases, a minimum modulation frequency may be constrained by a total harmonic distortion (THD) of output voltage and current, and a maximum modulation frequency may be a highest switching frequency restricted by switching devices.

Based on the carrier frequency range in step 70, step 701, which includes steps of 71, 72 and 73, generates frequency modulation carrier signals. For instance, step 71 calculates a carrier frequency $f_{LM}$ with a linear frequency modulation and $u(t) \in [-1, 1]$ which is a sawtooth signal of period T. In step 72, a carrier phase $\phi_{LM}$ is obtained based on the carrier frequency $f_{LM}$. Step 73 defines a sine carrier $c_{LS}$ or a triangle carrier $c_{LT}$ using the carrier phase $\phi_{LM}$. When we use the linear frequency modulation sine or triangle carrier to generate PWM signal for the PWM signal generator 840, EMI spectrum is measured. The frequency modulation carrier signals generated in step 701 are provided to a PWM signal generator 840. Further, step 74 measures an EMI spectrum $M(f)$ between the minimum frequency $f_{min}$ and a maximum frequency $f_{max}$, and the measured EMI spectrum is used to generate updated frequency modulation carrier signals in step 702. In this case, the step 702 includes steps 76, 77, and 78, and uses a desired flat EMI spectrum 75.

Based on measured EMI spectrum $M(f)$, step 76 defines a nonlinear frequency modulation $f_{NM}$. Further, step 77 obtains an updated carrier phase $\phi_{NM}$ according to the nonlinear frequency modulation $f_{NM}$, and step 77 obtains an updated sine carrier $c_{NS}$ or an updated triangle carrier $c_{NT}$. In final, step 78 outputs the updated frequency modulation carrier signal to the PWM signal generator 840, wherein the frequency modulation carrier signal is compared with a reference signal to generator a PWM signal controlling the PWM inverter with a reduced EMI level.

Figure 8:
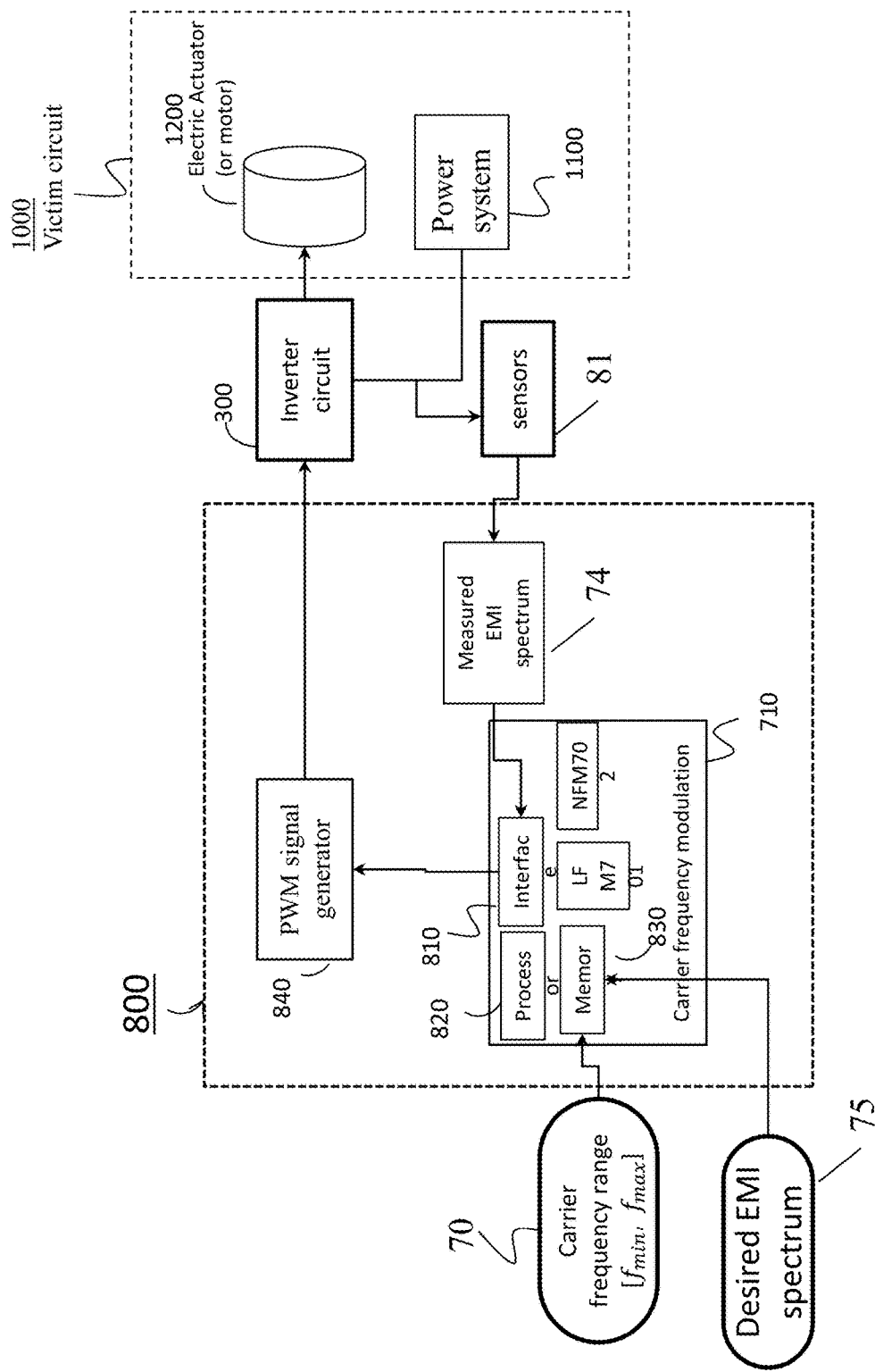
FIG. 8 is a schematical illustrating a controller for generating PWM signals using frequency modulation carrier signals to control a PWM inverter driving an electric actuator, according embodiments of the present disclosure.

FIG. 8 is a schematic illustrating an example configuration of a controller 800 for generating carrier signals controlling an inverter driving an electric actuator, according to some embodiments of the present disclosure. The controller 800 is configured to generate PWM signals controlling an inverter circuit 300 that drives an electric actuator 1200 (or motor). The controller 800 includes carrier frequency modulation unit (circuit module) 710 and a PWM signal generator 840. The carrier frequency modulation unit 710 is configured to perform the process 700 including steps for generating frequency modulation carrier signals. The carrier frequency modulation unit 710 may include an interface (interface controller) 810 configured to connect to the sensor 81 connected to the invertor circuit 300, a processor 820, a memory unit 830 configured to store a measured electromagnetic-interference (EMI) spectrum 74, a desired EMI spectrum 75, a carrier frequency range 70, linear frequency modulation (LFM) program 701 and a nonlinear frequency modulation (LFM) program 702. The processor 820 is configured to perform computing a PWM reference signal. The EMI suppression rate is determined by the measured EMI spectrum 74 and the desired EMI spectrum 74 by the processor 820. The carrier frequency modulation unit 700 is configured to compute the sweep time of each discrete frequency in each sweep period using the EMI suppression rate, and to modulate carrier frequency based on the sweep time of each frequency. The controller 800 further includes a PWM signal generator 840 that is configured to generate PWM signals based on frequency modulation carrier signal and the reference signal. The PWM signal generator 840 can transmit the PWM signals to the inverter circuit 300.

In some cases, the measured EMI spectrum 74 is obtained based on the linear frequency modulation (LFM) 701, the frequency modulation may be performed by periodic sawtooth signal. Further, the modulation frequency may be performed as a function of the EMI suppression rates. The measured EMI spectrum 74 may be obtained from a frequency response of the victim circuit using a LISN when a linear frequency modulation carrier signal is used to generate PWM signal for the inverter circuit 300.

In another embodiment, the processor 820 can be a signal processor 820 that may be configured for generating modulation parameters to be used by a PWM signal generator 840 that generates PWM signals controlling the inverter circuit 300 driving an electric actuator 1200. The signal processor 820 is connected to an interface 810 configured to connect to the PWM signal generator 840, a memory unit 830 configured to store a measured electromagnetic-interference (EMI) spectrum 74 and a desired EMI spectrum 74, an EMI suppression rate program (not shown in the figure). In this case, the signal processor 820 is configured to compute EMI suppression rates for a frequency range, where the EMI suppression rates are determined by a frequency response of a victim circuit 1000 including at least the power system 1100 or at least the electric actuator 1200 or a combination of the power system 1100 and the electric actuator 1200. Further, the signal processor 820 is configured to compute the sweep time of each frequency in each sweep period according to the EMI suppression rates. The signal processor 820 is configured to modulate the frequency of carrier signal according to the sweep time of each frequency to generate frequency modulation carrier and to transmit the frequency modulation carrier to the PWM signal generator 840. After receiving the frequency modulation carrier, the PWM signal generator 840 generates PWM signals based on the frequency modulation carrier and the reference signal of the signal processor 820 and transmits the PWM signal to the inverter circuit 300, such that EMI noises to the victim circuit 1000 is sufficiently reduced.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A controller for generating carrier signals controlling a pulse width modulation (PWM) inverter driving an electric actuator, comprising:
   an interface configured to connect to a victim circuit, wherein the victim circuit includes the power system or the electric actuator or a combination of the power system and the electric actuator;
   a memory configured to store a modulation frequency range, a measured electromagnetic-interference (EMI) spectrum, a desired EMI spectrum and an EMI suppression rate program; and
   a processor, in connection with the memory, configured to perform:
   computing EMI suppression rates for the frequency range, wherein the EMI suppression rates are determined by the measured EMI spectrum and the desired EMI spectrum;
   computing sweep duration of discrete frequency, wherein the sweep duration is determined by the EMI suppression rate of the discrete frequency;
   a modulator configured to modulate carrier frequency according to the sweep duration of each frequency; and
   a PWM generator configured to generate PWM signals based on the frequency modulation carrier and to transmit the PWM signals to the PWM inverter.

2. The controller of claim 1, wherein the modulator modulates the carrier signals based on a linear frequency modulation carrier.

3. The controller of claim 1, wherein the modulator monotonically increases the carrier frequency based on a linear frequency modulation (LFM) carrier.

4. The controller of claim 1, wherein the modulator monotonically decreases the carrier frequency based on a linear frequency modulation (LFM) carrier.

5. The controller of claim 1, wherein the frequency modulation is performed by sawtooth carriers.

6. The controller of claim 1, wherein the modulation frequency is performed as a function of the EMI suppression rates.

7. The controller of claim 1, wherein the measured EMI spectrum is obtained from a frequency response of the victim circuit using a linear frequency modulation.

8. The controller of claim 7, the linear frequency modulation is performed by a linear modulation sine or triangle wave.

9. The controller of claim 1, wherein the victim circuit is a power system or an electric actuator.

10. The controller of claim 1, wherein a minimum modulation frequency is constrained by a total harmonic distortion (THD) of output voltage and current, and a maximum modulation frequency is a highest switching frequency restricted by switching devices.

11. The controller of claim 1, the modulator modulates the carrier signals by using a nonlinear frequency modulation (NFM) carrier.

12. The controller of claim 11, wherein the NFM carrier is an NFM sine carrier.

13. The controller of claim 11, wherein the NFM carrier is an NFM triangular carrier.

14. The controller of claim 1, wherein the modulator monotonically increases the carrier frequency based on a nonlinear frequency modulation (NFM) carrier.

15. The controller of claim 1, wherein the modulator monotonically decreases the carrier frequency based on a nonlinear frequency modulation (NFM) carrier.

16. The controller of claim 1, wherein the inverter operates at least three phases.

17. The controller of claim 1, wherein the inverter is connected to the electric actuator, wherein the modulated carrier signals are provided to the inverter via the interface.

18. A signal processor for generating modulation parameters to be used by a signal modulator that generates carrier signals controlling an inverter driving an electric actuator, comprising:
   an interface configured to connect to a signal modulator;
   a memory configured to store a modulation frequency range, a measured electromagnetic-interference (EMI) spectrum, a desired EMI spectrum and an EMI suppression rate program; and
   a processor, in connection with the memory, configured to perform:
   computing EMI suppression rates for a frequency range, wherein the EMI suppression rates are determined by the measured EMI spectrum and desired EMI spectrum;
   computing sweep duration of discrete frequency, wherein the sweep duration is determined by the EMI suppression rate of the discrete frequency;
   a modulator configured to modulate carrier frequency according to the sweep duration of each frequency; and
   a PWM generator configured to generate PWM signals based on the frequency modulation carrier and to transmit the PWM signals to the PWM inverter via the interface.

19. The signal processer of claim 18, wherein the modulation parameters are used by the signal modulator so as to modulate the carrier signals based on a linear frequency modulation carrier.

20. The signal processer of claim 18, wherein the modulation parameters are used by the signal modulator such that the frequency modulation is performed by sawtooth carriers.

21. The signal processor of claim 18, wherein the modulation parameters are used by the signal modulator such that the modulation frequency is performed as a function of the EMI suppression rates.

22. The signal processer of claim 18, wherein the measured EMI spectrum is obtained from a frequency response of the victim circuit using a linear frequency modulation.

23. The signal processor of claim 18, wherein the victim circuit is a power system or an electric actuator.

24. The signal processor of claim 18, wherein a minimum modulation frequency is constrained by a total harmonic distortion (THD) of output voltage and current, and a maximum modulation frequency is a highest switching frequency restricted by switching devices.

* * * * *